United States Patent
Salgado et al.

(10) Patent No.: US 12,436,840 B2
(45) Date of Patent: Oct. 7, 2025

(54) ELECTRONIC DEVICE COMPRISING A BLUETOOTH COMMUNICATION UNIT

(71) Applicant: EM Microelectronic-Marin SA, Marin (CH)

(72) Inventors: Stéphanie Salgado, La Neuveville (CH); Thomas Eberhardt, Cernier (CH)

(73) Assignee: EM Microelectronic-Marin SA, Marin (CH)

( * ) Notice: Subject to any disclaimer, the term of this patent is extended or adjusted under 35 U.S.C. 154(b) by 114 days.

(21) Appl. No.: 18/544,732

(22) Filed: Dec. 19, 2023

(65) Prior Publication Data
US 2024/0211342 A1 Jun. 27, 2024

(30) Foreign Application Priority Data
Dec. 23, 2022 (EP) ..................................... 22216578

(51) Int. Cl.
*G06F 11/10* (2006.01)
(52) U.S. Cl.
CPC ................................ *G06F 11/1044* (2013.01)
(58) Field of Classification Search
CPC ...... H03M 13/09; H03M 13/13; H03M 13/15; H03M 13/19; H03M 13/1575; H04L 1/0061; G06F 11/1044
See application file for complete search history.

(56) References Cited

U.S. PATENT DOCUMENTS

| | | | |
|---|---|---|---|
| 2010/0211990 A1* | 8/2010 | Hou | H04L 25/06 726/2 |
| 2022/0045696 A1* | 2/2022 | Boussard | H03M 13/1575 |

OTHER PUBLICATIONS

European Search Report issued May 9, 2023 in European Application 22216578.9 filed on Dec. 23, 2022, 2 pages.

(Continued)

*Primary Examiner* — Shelly A Chase
(74) *Attorney, Agent, or Firm* — Oblon, McClelland, Maier & Neustadt, L.L.P.

(57) ABSTRACT

An electronic device including a Bluetooth communication unit configured to perform Bluetooth communication, this unit including a memory module containing a memory controller and a memory element equipped with at least one page (P) including at least one encoded data (E) including a binary code being formed by a word (W 0-N) and its associated redundancy code (RC 0-N), the memory controller being configured to store a user data in this page (P) by performing error correction code (ECC) calculations on this user data for providing an associated redundancy code (RC 0-N) corresponding to an erased redundancy code (RC E) for this user data, if this user data has a reference binary code of an erased word (W E), the erased redundancy code (RC E) having a binary value similar to that of the reference binary code.

10 Claims, 1 Drawing Sheet

(56) References Cited

OTHER PUBLICATIONS

"IEEE Std 802.15.1—2005 IEEE Standard for Information technology—Telecommunications and information exchange between systems—local and metropolitan area networks—Specific requirements, Part 15.1: Wireless medium access control (MAC) and physical layer (PHY) specifications for wireless personal area networks (WPANs)", Jan. 2005, 599 pages, XP017600963.
Wilson, "Linear Block Codes", Digital Modulation and Coding, Jan. 1996, 32 pages, X9002275914.
LAN/MAN Standards Committee of the IEEE Computer Society, "IEEE P802.15.3-Rev.B/D0.3 Draft Standard for Wireless Multi-Media Networks", vol. 802.15, No. DO.3, Jul. 2022, 679 pages, XP068192034.

* cited by examiner

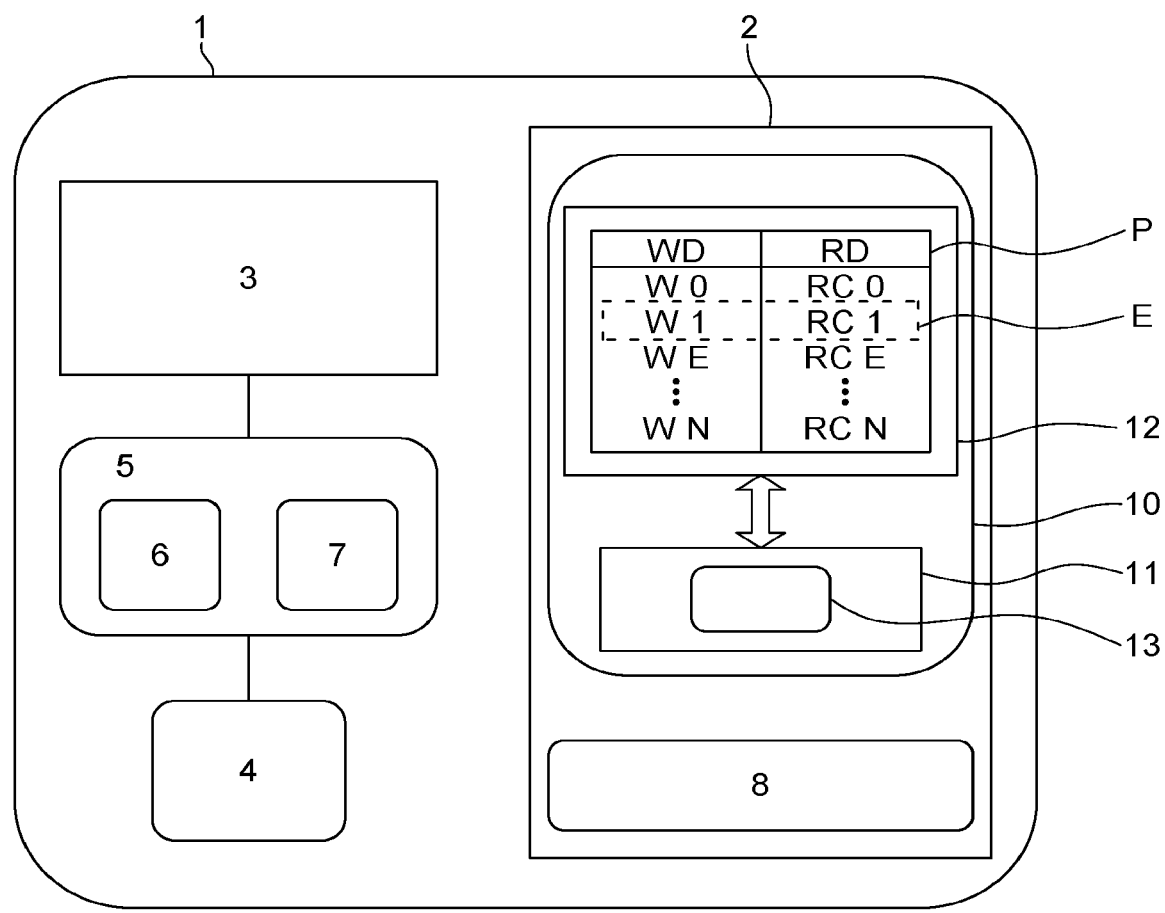

ELECTRONIC DEVICE COMPRISING A BLUETOOTH COMMUNICATION UNIT

CROSS-REFERENCE TO RELATED APPLICATION

This application claims priority to European Patent Application No. 22216578.9 filed on Dec. 23, 2022, the entire disclosure of which is hereby incorporated herein by reference.

FIELD OF THE INVENTION

Embodiments of the present disclosure relate to an electronic device comprising a Bluetooth communication unit, this unit implementing Error Correcting Codes.

BACKGROUND OF THE INVENTION

It is known in the prior art that error correcting codes are sometimes used in a memory element to increase data integrity. During write operations, ECC values describing the write data are calculated, and stored in an memory element with the write data. On read operations, it is determined whether the ECC values read from memory element are consistent with the corresponding data values read from this memory element. If an ECC error is detected (i.e., the ECC is not consistent with the data), in some cases, this error can be corrected.

In order to increase data integrity in element memory of a Bluetooth electronic device, there is a need to implement an ECC in such an electronic device.

SUMMARY OF THE INVENTION

An object of the invention is to provide an electronic device comprising a Bluetooth communication unit configured to perform Bluetooth communication, this unit including a memory module containing a memory controller and a memory element equipped with at least one page including at least one encoded data consisting in a binary code being formed by a word and its associated redundancy code, the memory controller being configured to store a user data in this page by performing error correction code calculations on this user data for providing an associated redundancy code corresponding to an erased redundancy code for this user data, if this user data has a reference binary code of an erased word, the said erased redundancy code having a binary value similar to that of the reference binary code.

In other embodiments:
the memory controller comprised memory means in which a special error correction code algorithm is stored to compute this associated redundancy code from this user data;
it this special error correction code algorithm comprises the following mathematical formula:

$$SECC\ (X) = BECC\ (X)\ XOR\ BECC\ (W\ E)\ XOR\ (RC\ E)$$

with:
X: the binary value of the user data;
BECC (X): a binary code of a redundancy code of the user data obtained from a binary error correction code algorithm;

BECC (W E): a binary code of a redundancy code of an erased word obtained from a binary error correction code algorithm;
RC E: a binary code of a redundancy code having a binary value similar to that of a binary code of the erased word;
the associated redundancy code computed by the memory controller running the SECC algorithm is the erased redundancy code when its binary code is similar to the reference binary code;
the associated redundancy code computed by the memory controller running the SECC algorithm is a specific redundancy code when its binary code is different from the reference binary code;
the memory controller is configured to write in the page an encoded data comprising a word related to this user data with the associated redundancy code provided;
the memory controller is configured to access to a user data stored in a page of the memory element, by performing error correction code calculations on an encoded data of this page relating to this user data;
the memory controller of providing the user data relating to this encoded data in function of its consistency status, by obtaining the user data if the coherence status provides that:
the user data has been decoded, that is to say no correction has been realised on the word corresponding to this user data because no SECC error has been identified, or
the word has been corrected, because at least one SECC error corrigible has been identified.
the electronic device comprises at least one data generator and a data generator circuit;
the Bluetooth communication unit implements a Bluetooth low energy technology.

BRIEF DESCRIPTION OF THE DRAWINGS

The present invention will be described subsequently in more detail with reference to the attached FIG. 1, given by way of examples, but in no way limited thereto. More specifically, this FIG. 1 represents an electronic device comprising a Bluetooth communication unit implementing error correcting codes, according to embodiments of the invention.

DETAILED DESCRIPTION OF THE INVENTION

The following description is intended to illustrate specific embodiments of the invention, and not to limit the invention. Thus, nothing in this detailed description is intended to imply that any particular feature, characteristic or component is essential to the invention. The invention is defined only by the claims.

Referring now to the FIG. 1, embodiments of the present invention, relates to an electronic device 1 comprising a Bluetooth communication unit 2 implementing preferably a Bluetooth low energy (known by the acronym "BLE") technology. This electronic device 1 is configured to generate and transmit messages from this Bluetooth communication unit 2. Such a message contains preferably a payload including useful data, which can be, processed continuously, for instance periodically.

In this context, this useful data can be for example phenomenon data also called event data. These phenomenon data can comprise physical and/or biological values. Such values are relating to physical quantities or biological quantities. It can be understood that a physical quantity is included in the field of physical sciences and a biological quantity in the field of the life sciences (also called "biology"). These values have been figured out by this electronic device 1 from at least one measurement of the physical quantity or the biological quantity evaluated by the at least one data generator 4 of this device 1.

Furthermore, these useful data can also be notification data. These data include alphanumeric characters relating to an informative communication. This informative communication can contain alert communication, news communication, event communication, etc.

This electronic device 1 can be for example used in a system for monitoring phenomenon data relating for example to physical quantities such as tire pressure measurement in a Tire Pressure Monitoring Systems (known by the acronym "TPMS"). In this kind of system, this electronic device 1 can be a TPMS electronic device 1 comprised in a tire of a vehicle. In this context such a TPMS electronic device 1 is configured to communicate with a vehicle electronic control unit (known by the acronym "ECU") in order to send to this latter tire pressure measurement via an operating mode of the Bluetooth standard.

In this electronic device 1, the Bluetooth communication unit 2 includes a memory module 10 and a set of constituent elements 8 of this unit 2. This set of constituent elements 8 is capable of cooperating with the memory module 10 in order to ensure Bluetooth communication with another Bluetooth electronic device (such as a smartphone, an ECU, etc) and the exchange of messages with this other electronic device.

Such a memory module 10 contains a memory controller 11 and a memory element 12. The memory element 12 comprises at least one page P including at least one encoded data E consisting in a binary code. This encoded data E is formed by a word W 0-N and its associated redundancy code RC 0-N.

As it will be appreciated by those skilled in the art, a page P may be the smallest unit of programming.

In this memory module 10, the memory controller 11 comprises a particular error correction code algorithm, also named "error correcting code algorithm", here a special error correction code algorithm, also called "SECC algorithm". This SECC algorithm is preferably stored in memory means 13 of this memory controller 11. This SECC algorithm once it is executed by the memory controller 11, is notably configured to exclude error generation when the word is an erased word comprised in the page P within the memory element 12. Such a SECC algorithm is used to encode data to be stored into the page P of the memory element, and to decode stored data of this page P.

In this context, the use of this SECC algorithm also enables the accuracy of data stored within the page P to be improved. It can be noted that the implementation of this SECC algorithm limits or even avoids the generation of false errors in comparison with the error correction code algorithms of the prior art.

Such a SECC algorithm comprises the following mathematical formula:

$$SECC\ (X) = BECC\ (X)\ XOR\ BECC\ (W\ E)\ XOR\ (RC\ E)$$

with:
X: the binary code of an user data;
BECC (X): a binary value of a redundancy code of the user data obtained from a binary error correction code algorithm also called "BECC algorithm" which can be, for example, part of a family of linear error-correcting codes;
BECC (W E): a binary code of a redundancy code of an erased word W E obtained from the BECC algorithm;
RC E: a binary code of a redundancy code RC E:
 having a binary value similar to that of a binary code of the erased word W E, or
 being equal bitwise (or at bit level) to a binary code of the erased word W E.

In reference to FIG. 1, this electronic device 1 includes in a non-limiting and/or non-exhaustive manner:
 the Bluetooth communication unit 2;
 a processing unit 3 (also referred to as a "controller") including hardware and software resources, in particular at least one processor cooperating with memory elements;
 the at least one data generator 4, and
 a data generator circuit 5 which may be referred to as a signal processing circuit 6 and/or a signal conditioning circuit 7 that receives this electric signal from the at least one data generator 4 in the form of raw measurement data.

In this electronic device 1, the processing unit 3 is connected to the Bluetooth communication unit 2 and the data generator circuit 5 which is connected to the at least one data generator 4.

In this configuration, the data generator 4 is preferably a sensor. This sensor is an element capable to convert a physical quantity or a biological quantity to be measured to an electric signal (also called "sensor signal"). Such a physical quantity can be for example a tire pressure of a vehicle in a context of Tire Pressure Monitoring System (known by the acronym "TPMS"), or atmospheric pressure and air temperature monitoring for a weather forecasting system, etc . . . . Regarding biological quantity, it can be for example a heart rate and a blood pressure monitored in the context of electrocardiogramastem. Sensors can also measure insulin rate, brain signal etc . . . . Other applications can be in the field of agriculture where moisture rate, chemical properties of the soil are measured. Other sensors are present in the fire protection and safety area. Sensors detect the presence of radioactivity, gas such as monoxide of carbon, nanoparticles, etc . . . .

Alternatively, this data generator 4 can be a wireless communication device such a transponder for example a car key fob to unlock a vehicle wirelessly. In the consumer area, connected wearables such as connected watches are typical examples of devices that receive notifications, calls, messages and other data generated by a smartphone.

In this electronic device 1, the data generator circuit 5 may include an analog-to-digital converter (known by the acronym "ADC") that converts the analog signal from the value relating to a physical quantity or a biological quantity to a digital signal. The data generator circuit 5 may also include a digital signal processor (known by the acronym "DSP") that performs some processing on the digital signal (e.g., to prepare physical or a biological quantity value for transmission). Therefore, the data generator package comprises a circuit which conditions and amplifies the small signal of this value via signal processing and/or conditioning. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a data generator output suitable for processing after conditioning.

In the memory module 10, the memory element 12 is managed by the memory controller 11 in order to address, and enable information to be stored into, read from, and erased from the pages.

In this memory module 10 of the Bluetooth communication unit 2, such a memory element 12 can be for example a non-volatile memory and/or a volatile memory.

As shown in FIG. 1, the page of the memory element 12 includes word data WD and redundancy code data RD. Word data WD includes one or several words W 0-N and redundancy code data RD typically comprises redundancy codes RC 0-N that have been calculated from the user data related to the words W 0-N. In this context, each word and its redundancy code RC 0-N also called "associated redundancy code" form together the encoded data E. It can be noted that in this encoded data E, each word and its redundancy code can be interleaved or interlaced together.

In this page P where each associated redundancy code RC 0-N is specific to a given word W 0-N, the words W 0-N and their corresponding redundancy codes RC 0-N each consist of a binary code. In this context, the memory controller 11 of the memory module 10 calculates the redundancy code RC 0-N when data is being programmed into the page P, and also checks the redundancy code RC 0-N when data is being read from this page P.

As we will see later, the memory controller 11 is mainly configured to store and retrieve data in the memory element 12. In other word, this memory controller 11 enables information to be read from and written in this memory element 12.

More specifically, the memory controller 11 is configured to store a user data in the page P of the memory element 12 by performing error correction code calculations on this user data for providing an associated redundancy code RC 0-N. In this context, this associated redundancy code RC 0-N corresponds to an erased redundancy code RC E for this user data, if this user data has a reference binary code of an erased word W E. In other words, if the binary code of the user data is equal/similar to the binary code of the erased word W E called here "reference binary code". It can be noted that the erased redundancy code RC E have a binary value similar to that of the reference binary code erased word W E.

In this context, the redundancy code of an erased word W E, also called here "erased redundancy code RC E", always has a binary value similar to that of the binary code of this erased word W E. This binary value concerns the values of all the bits of the binary code of the erased word W E and its redundancy code which can be by convention 0 or 1. In other words, the binary code of the erased redundancy code RC E is equal bitwise (or at bit level) to the binary code br of its erased word W E.

For example, when all the bits of the erased word W E have each the value of "1", all the bits of its redundancy code have also each the value of "1". In other words, an encoded data stored in the page P, comprising the erased word W E and its erased redundancy code RC E, has a binary code with all its bits to the value "1". In this last example, the binary value of this encoded data is composed of all "1"s.

Thus in this configuration, this memory controller 11, by running the SECC algorithm stored in its memory means 13, is able to compute/generate this associated redundancy code RC 0-N from this user data. In this context, the associated redundancy code RC 0-N computed is:

the erased redundancy code RC E when its binary code is similar to the reference binary code, or a specific redundancy code when its binary code is different from the reference binary code.

It can be understood here, that the specific redundancy code is different from the erased redundancy code RC E. Moreover, the computation of the erased redundancy code RC E and the specific redundancy code is performed by the memory controller 101 running the same algorithm, here the SECC algorithm.

In this memory module 10, the memory controller 11 is configured to write in the page P an encoded data E related to the user data. This encoded data E comprises a word W 0-N related to this user data with the associated redundancy code RC 0-N previously provided or obtained. Thus, the word W 0-N corresponding to this user data, is stored with its associated redundancy code RC 0-N. In other word, the memory controller 11 writes in this page P the encoded data E formed by this word corresponding to the user data with its associated redundancy code RC 0-N. As already discussed, this associated redundancy code can be the specific redundancy code or the erased redundancy code previously generated/calculated.

It may be noted that the fact that the memory controller 11 is configured to provide an erased redundancy code for the user data when the binary code of this user data, is similar to that of an erased data W E, contributes to avoid the generation of an ECC error by the SECC algorithm run by the controller 11 when this last one reads/access to an erased word W E comprised in a page P of this memory element 12.

Furthermore, in the memory module 10, the memory controller 11 is configured to access to/retrieve/collect a user data stored in a page P of the memory element 12, by performing error correction code ECC calculations on an encoded data E of this page P relating to this user data. More specifically, the controller 11 accesses to the page P in order to extract/read this user data stored as an encoded data E in this page P. As we seen before, this encoded data E is formed by a word W 0-N and its associated redundancy code RC 0-N relating to this user data.

To do that the memory controller 101 is configured to provide the user data relating to this encoded data E in function of its consistency status. In this context, this memory controller 101 verifies the consistency of the word W 0-N included in the encoded data E. More specifically, the memory controller 101 by running the SECC algorithm controls if this word W 0-N is consistent with its associated redundancy code RC 0-N.

Thus, the user data is obtained if the coherence status provides that:

the user data has been decoded, that is to say no correction has been realised on the word W 0-N corresponding to this user data because no SECC error has been identified, or the word W 0-N has been corrected, because at least one SECC error corrigible has been identified.

It can be noted that this user data cannot be obtained by the memory controller if the coherence status provides that the word W 0-N relating the user data is incorrigible because at least one ECC error non-corrigible has been identified.

The foregoing is only illustrative of preferred embodiments of the present invention. The present invention is not limited to the above embodiments. It should be understood that further improvements and changes that are directly derived or conceived by those skilled in the art without departing from the basic concept of the present invention should be considered to be included in the protective scope of the present invention.

The invention claimed is:

1. An electronic device comprising a Bluetooth communication unit configured to perform Bluetooth communication, said unit including a memory module containing a memory controller and a memory element equipped with at least one page (P) including at least one encoded data (E) including a binary code being formed by a word (W 0-N) and its associated redundancy code (RC 0-N), the memory controller being configured to store a user data in said page (P) by performing error correction code (ECC) calculations on said user data for providing an associated redundancy code (RC 0-N) corresponding to an erased redundancy code (RC E) for said user data, if said user data has a reference binary code of an erased word (W E), the said erased redundancy code (RC E) having a binary value similar to that of the reference binary code.

2. The electronic device according to claim 1, wherein the memory controller comprised a memory in which a special error correction code algorithm (SECC) is stored to compute said associated redundancy code (RC 0-N) from said user data.

3. The electronic device according to claim 1, wherein said special error correction code algorithm (SECC) comprises the following mathematical formula:

$$SECC\ (X) = BECC\ (X)\ XOR\ BECC\ (W\ E)\ XOR\ (RC\ E)$$

with:
X: the binary value of the user data;
BECC (X): a binary code of a redundancy code of the user data obtained from a binary error correction code algorithm (BECC);
BECC (W E): a binary code of a redundancy code of an erased word (W E) obtained from a binary error correction code algorithm (BECC);
RC E: a binary code of a redundancy code (RC E) having a binary value similar to that of a binary code of the erased word (W E).

4. The electronic device according to claim 1, wherein the memory controller comprised a memory in which a special error correction code algorithm (SECC) is stored to compute said associated redundancy code (RC 0-N) from said user data, said associated redundancy code (RC 0-N) computed by the memory controller running the SECC algorithm being the erased redundancy code (RC E) when its binary code is similar to the reference binary code.

5. The electronic device according to claim 1, wherein the memory controller comprised a memory in which a special error correction code algorithm (SECC) is stored to compute said associated redundancy code (RC 0-N) from said user data, said associated redundancy code (RC 0-N) computed by the memory controller running the SECC algorithm being a specific redundancy code when its binary code is different from the reference binary code.

6. The electronic device according to claim 1, wherein the memory controller is configured to write in the page (P) an encoded data (E) comprising a word (W 0-N) related to said user data with the associated redundancy code (RC 0-N) provided.

7. The electronic device according to claim 1, wherein the memory controller is configured to access to a user data stored in a page (P) of the memory element, by performing error correction code (ECC) calculations on an encoded data (E) of said page (P) relating to said user data.

8. The electronic device according to claim 1, wherein the memory controller is configured to access to a user data stored in a page (P) of the memory element, by performing error correction code (ECC) calculations on an encoded data (E) of said page (P) relating to said user data, said memory controller of providing the user data relating to said encoded data (E) in function of its consistency status, by obtaining the user data if the coherence status providing that:
the user data has been decoded, that is to say no correction has been realised on the word (W 0-N) corresponding to said user data because no SECC error has been identified, or
the word W 0-N has been corrected, because at least one SECC error corrigible has been identified.

9. The electronic device according to claim 1, further comprising at least one data generator and a data generator circuit.

10. The electronic device according to claim 1, wherein the Bluetooth communication unit implements a Bluetooth low energy technology.

* * * * *